May 5, 1970   R. T. H. COLLIS   3,510,225
VISIBILITY INDICATING SYSTEM
Filed May 31, 1966                                2 Sheets-Sheet 1

INVENTOR.
RONALD T. H. COLLIS
BY Samuel Lindenberg
Abraham Wasserman
ATTORNEYS

May 5, 1970  R. T. H. COLLIS  3,510,225
VISIBILITY INDICATING SYSTEM
Filed May 31, 1966  2 Sheets-Sheet 2

INVENTOR.
RONALD T. H. COLLIS
BY Samuel Lindenberg
Abraham Wasserman
ATTORNEYS

United States Patent Office 3,510,225
Patented May 5, 1970

3,510,225
VISIBILITY INDICATING SYSTEM
Ronald T. H. Collis, Menlo Park, Calif., assignor to Stanford Research Institute, Menlo Park, Calif., a corporation of California
Filed May 31, 1966, Ser. No. 553,896
Int. Cl. G01n 23/06
U.S. Cl. 356—4            9 Claims

ABSTRACT OF THE DISCLOSURE

A visibility indicating system in which the mean coefficient of extinction over a critical path from a selected point at a critical height to the ground, is determined, as a function of the back-scattered returns of light from the critical height along two elevated paths, differing from each other only by a selected angular value. The mean coefficient of extinction, so measured, is compared with a critical coefficient of extinction, derived from the actual range between runway lead-in lights on the ground and the critical height, the light intensity and a visual threshold level. By comparing the measured mean coefficient of extinction with the derived critical coefficient of extinction value, it can be determined whether a pilot is expected to see the runway and lead-in lights from the critical height below which he is not to proceed in absence of sighting of actual ground.

---

This invention relates to an optical measuring system, and more particularly to a system for indicating visibility conditions.

Since, at present, most airplanes are landed manually, it is a primary requirement that the pilot obtain visual reference of the landing strip at a minimum height required for safe landing. This height is often referred to as the critical height below which the pilot may not proceed without obtaining visual reference. To provide such a visual reference, air fields are equipped with runway and lead-in lights, of an intensity which is assumed to be sufficiently high for a pilot to see them from the critical height above the runway.

However, whether at any given time the pilot actually sees the lights from such height, depends on the atmospheric conditions existing at such time, which affect the optical attenuation over a path, hereafter referred to as the critical path which extends from the critical height on the aircraft's landing approach to the lead-in lights. That is, whether the lights are visible from the critical height depends substantially on the light's optical attenuation. Therefore, providing a system, capable of indicating the visibility or light intensity at the critical height to provide an indication whether a pilot can see the runway and lead-in lights from such height, would be most advantageous for the safe landing of airplanes.

It is therefore an object of the invention to provide a system for assessing or indicating visibility conditions.

Another object is to provide a system useful in determining safe landing conditions.

A further object is the provision of a system for indicating the light intensity at a selected critical height above the ground to determine whether the ground can be seen from such height.

Still a further object is to provide a system for measuring the mean coefficient of extinction over a critical path, to provide an indication whether a pilot is expected to see landing and lead-in lights from a critical height above the ground.

These and other objects are achieved by providing a system in which the mean coefficient of extinction over the critical path, i.e. from selected points at the critical height to the ground, is determined, as a function of the back-scattered returns from the same level or height along two elevated paths, differing from each other only by a selected angular value. The mean coefficient of extinction, so measured, is compared with a critical coefficient of extinction derived from the actual range between the lights and the critical height, the light intensity and a visual threshold level, in a relationship to be described hereinafter. By comparing the measured mean coefficient of extinction with the critical coefficient of extinction value, it can be determined whether a pilot is expected to see the runway and lead-in lights from the critical height below which he is not to proceed in absence of sighting of the ground.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
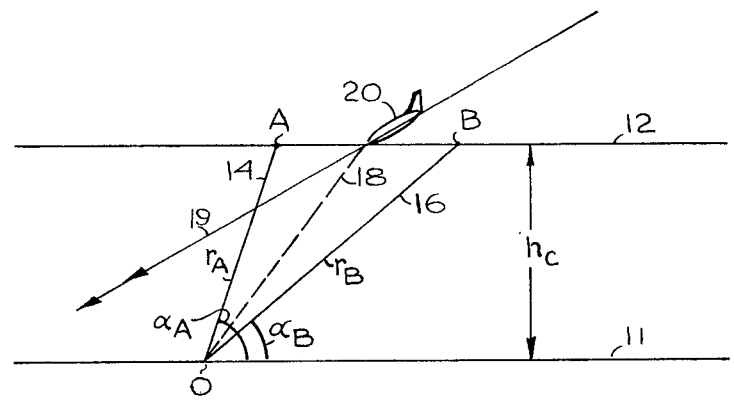
FIG. 1 is a diagram useful in explaining the principles of operation of the present invention.

For a complete understanding of the principles on which the present invention is based, reference is made to FIG. 1 which is a simplified diagram wherein line 11 represents a reference height, such as ground, and line 12 represents a plane at a height $h_c$ above ground, from which it is desired to determine whether a pilot at the critical height $h_c$ is expected to see runway and lead-in lights on the ground. Point 0 represents the location of a source of light which directs pulses of light in two directions or along two paths indicated by lines 14 and 16, forming respective angles $\alpha_A$, $\alpha_B$, with the ground line 11. Such a source may be a laser, in a laser radar system, hereinafter referred to as lidar. The lidar also includes receiving means for receiving the back-scattered light energy or returns from locations along the directions indicated by lines 14 and 16, which are distinguished in range.

In accordance with the teachings of the present invention, assuming that inhomogeneities in a turbid atmosphere are significant over small horizontal distances, it is submitted that by comparing the intensity of back-scattered light energy returns from the same level or height of the atmosphere, along two elevated paths such as 14 and 16, differing from each other by a small angular relationship, such as the difference between angles $\alpha_A$ and $\alpha_B$, and in length it is possible to determine or measure the mean coefficient of extinction in the layer of the atmosphere, at such height above the ground. Hereafter, the coefficient of extinction will be designated by $\bar{\sigma}$. Thus, in accordance with the teachings of the present invention, by comparing the intensity of back-scattered light energy returns from points A and B located along elevated paths 14 and 16 respectively, at the critical height $h_c$, the mean coefficient of extinction at the height may be determined. Representing the intensity of the back-scattered returns from points A and B as $I_A$ and $I_B$ respectively, the relationship therebetween may be expressed as follows:

$$\frac{I_B}{I_A} = \frac{r_B^{-2} \exp\left[-2 \csc \alpha_B \int_0^h \sigma(z)\, dz\right]}{r_A^{-2} \exp\left[-2 \csc \alpha_A \int_0^h \sigma(z)\, dz\right]} \qquad (1)$$

wherein $r_A$ and $r_B$ represent the distances or ranges between point 0 and locations A and B respectively.

Equation 1 may be rewritten to express the mean coefficient of extinction $\bar{\sigma}$ in terms of $I_B$ and $I_A$ respectively as follows:

$$\bar{\sigma} = \frac{1}{2(r_A - r_B)} \log_e \left[ \frac{I_B \operatorname{cosec}^2 \alpha_B}{I_A \operatorname{cosec}^2 \alpha_A} \right] \quad (2)$$

Since, for a given critical height $h_c$ the angles $\alpha_A$ and $\alpha_B$ are determinable as a function of the directions of transmitting the light energy, and the ranges $r_A$ and $r_B$ are determinable, the mean coefficient of extinction $\bar{\sigma}$ may be determined. This is accomplished by measuring the back-scattered light energy return intensities $I_A$ and $I_B$ respectively, in order to solve the righthand side of Equation 2.

To determine whether, from the critical height $h_c$, a pilot is expected to see the runway and lead-in lights, the measured mean coefficient of extinction $\bar{\sigma}$ may be compared with a critical value of a mean coefficient of extinction, derived from various parameters, on which it is dependent, expressed in the following relationship:

$$V = \frac{k}{\bar{\sigma}} \left[ \log_e \frac{B}{E_t} \right]^{-2 \log_e V} \quad (3)$$

where V represents visual range, B is related to the runway and lead-in light intensity, $E_t$ is a value for a visual threshold, and $k$ is a factor which includes safety margins. The critical value of the mean coefficient of extinction is easily derived by replacing the term V by a term D which represents the length of the critical path from the critical height $h_c$ on the landing path to the reference segment of landing lights. Schematically, the length of path D is shown in FIG. 1 by a line 18, representing the distance from an airplane 20 in an approach pattern 19 at the critical height $h_c$ to the landing lights, assumed to be located at point 0. As is appreciated by those familar with the art, the mean coefficient of extinction varies most significantly as a function of height or elevation. The change in the horizontal direction is quite small. The small angle difference between angles $\alpha_A$ and $\alpha_B$ is chosen so that a meaningful difference is produced between the elevation ranges $r_A$ and $r_B$. Assuming that $h_c$ is 300 feet, an angle difference of one or two degrees is sufficient. Assuming that the critical path (line 18) forms an angle of 15° with the ground, $\alpha_A$ and $\alpha_B$ may, for example, be 16° and 14°, respectively. These values are presented as examples rather than as a limitation on the teachings disclosed herein.

By comparing the measured mean coefficient of extinction $\bar{\sigma}$, determined from the measurements of the light intensity reflected from locations A and B, with the critical mean coefficient of extinction derived from the known lighting conditions at the airfield, in accordance with Equation 3, it is possible to determine whether a pilot is expected to see the runway and lead-in lights from the critical height $h_c$. As long as the measured value of the mean coefficient of extinction is not greater than the critical value of the coefficient, the visual range V is greater than the length D of the critical path and therefore, a pilot may be assumed to see the lights from the critical height.

Figure 2:
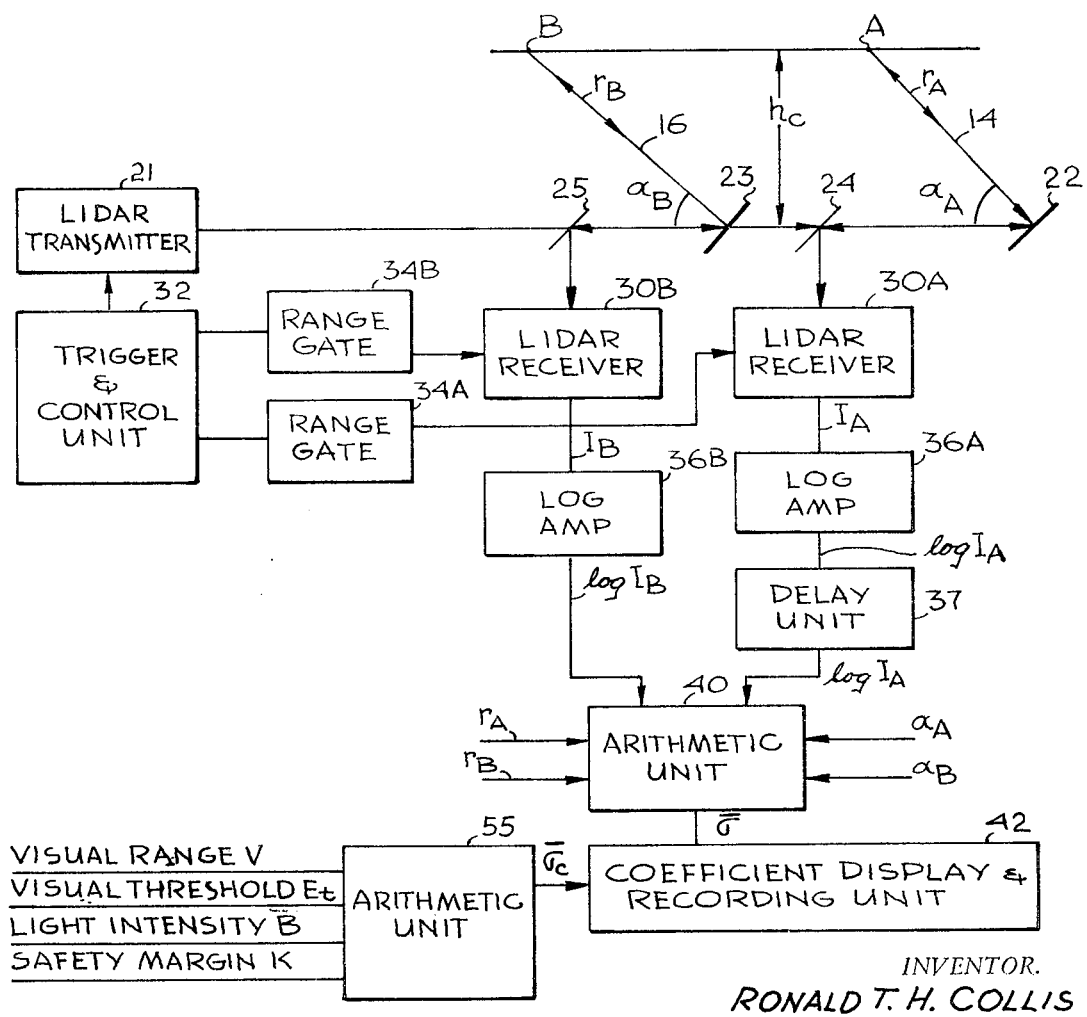
FIG. 2 is a block diagram of one embodiment of the invention.

Reference is now made to FIG. 2 which is a block diagram of one embodiment of the present invention for measuring the mean coefficient of extinction $\bar{\sigma}$, as a function of the back-skattered light energy returns from a critical height $h_c$, along two different elevation paths. Therein, block 21 represents a lidar transmitter, providing pulses of light of a predetermined frequency which are directed to a mirror 22 and a partially silvered mirror 23 to be reflected therefrom in the directions of elevated paths 14 and 16 respectively towards the critical height $h_c$. Back-scattered returns from locations A and B, along the two directions or paths from the critical height $h_c$, are reflected back through mirrors 22 and 23 by and through partially silvered mirrors 24 and 25.

As is appreciated from the foregoing description, the back-scattered energy, along the direction 14 is supplied to the receiver 30A while the back-scattered light energy from the direction 16 is supplied to lidar receiver 30B. It should be noted that in the specific arrangement diagrammed in FIG. 2, some back-scattered energy from direction 14 may be directed to receiver 30B through mirrors 24, 23 and 25. However such signals may be cancelled, such as by means of a subtractor (not shown) so that the only energy arriving at receiver 30B is that reflected back from direction 16. Each receiver provides output signals which are related to the intensity of the returns supplied thereto. The system of the present invention also includes a trigger and control unit 32, the function of which is to trigger transmitter 21 to produce the light pulses, as well as control range gates 34A and 34B. Unit 32 controls the gates 34A and 34B to enable receivers 30A and 30B respectively, to provide output signals only in response to the back-scattered returns from ranges including locations A and B respectively from the critical height $h_c$. The technique of range gating the returned signals is well known in the art of radar. Thus, it should be appreciated that the outputs of receivers 30A and 30B represent signals corresponding to the intensity of the back-scattered light energy returns, from locations A and B respectively.

These outputs are supplied as inputs to respective log amplifiers 36A and 36B, the outputs of which in turn represent the logarithm of the intensity signals $I_A$ and $I_B$ respectively. The output of log amplifier 36A is supplied to a delay unit 37, the function of which is to delay the signal received thereat by a time interval, equal to twice the time required for light to travel a distance equal to the difference between the paths $r_A$ and $r_B$. This delay is necessary to that the two signals representing the logarithm of $I_A$ and $I_B$ are coincidentally supplied to an arithmetic unit 40.

The latter unit may also be supplied with signals, representing the other factors expressed in Equation 2, in order to arithmetically determine or measure the mean coefficient of extinction $\bar{\sigma}$. It should be appreciated that since the other factors such as $r_A$, $r_B$, $\alpha_A$ and $\alpha_B$, are fixed parameters for any given system, these may be introduced as fixed values into the arithmetic unit so that by providing the unit with the two signals representing the log of $I_A$ and the log of $I_B$, the mean coefficient of extinction $\bar{\sigma}$ may be computed therein. It is appreciated that various arrangements of logic circuitry may be employed to generate a signal representing the mean coefficient of extinction in accordance with Equation 2, once signals representing the various factors on the righthand side of the equation are provided.

From the foregoing, it should thus be appreciated that the output of arithmetic unit 40 represents the measured value of the mean coefficient of extinction from the critical height $h_c$ above the ground to the ground along the critical path. This value may be supplied to a coefficient display and recording unit, wherein the value may be displayed and/or recorded in either analog or digital form for comparison with a critical value for the mean coefficient of extinction hereafter designated $\bar{\sigma}_c$, which is computable or derivable in accordance with Equation 3 hereinbefore defined. That is, the critical value of the mean coefficient of extinction $\bar{\sigma}_c$ may be manually derived and a signal corresponding thereto introduced into unit 42 so that the critical value of the mean coefficient of the extinction may be displayed simultaneously with the measured value provided by arithmetic unit 40.

Figure 3:
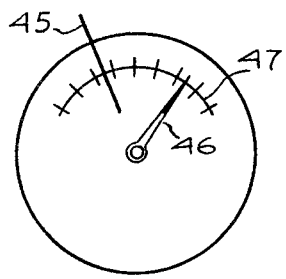
FIGS. 3 and 4 are simplified front views of two different display units.
Figure 4:
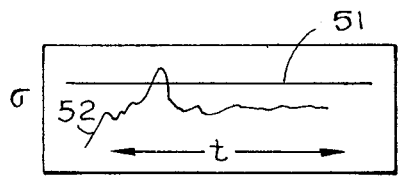

For example, as seen from FIG. 3, which represents the front face of an analog scaled meter, the value of the critical mean coefficient of extinction may be indicated thereon, such as by means of a mark represented by line 45. On the other hand, the actual or measured value of the coefficient of extinction, provided by arithmetic unit 40, is at all times indicated by the relative position of pointer 46 with respect to a scale 47. Similarly the coefficient display and recording unit 42 may comprise a continuous analog recorder, diagrammed in FIG. 4, in which the ordinate represents the σ value and the abscissa represents time. Therein, line 51 represents a continuous setting of the critical value of the mean coefficient of extinction derived by Equation 3, while line 52 of variable amplitude represents the value of the signals from arithmetic unit 40 representing the continuously measured value of the mean coefficient of extinction. Only when the measured value of the mean coefficient of extinction is less than the critical value of the mean coefficient of extinction, is it assumed that a pilot at the critical height $h_c$ would see the runway and lead-in lights. The value of the critical mean coefficient of extinction may be manually computed or automatically produced by an arithmetic unit 55, supplied with signals representing the various parameters of Equation 3, herebefore defined.

Figure 5:
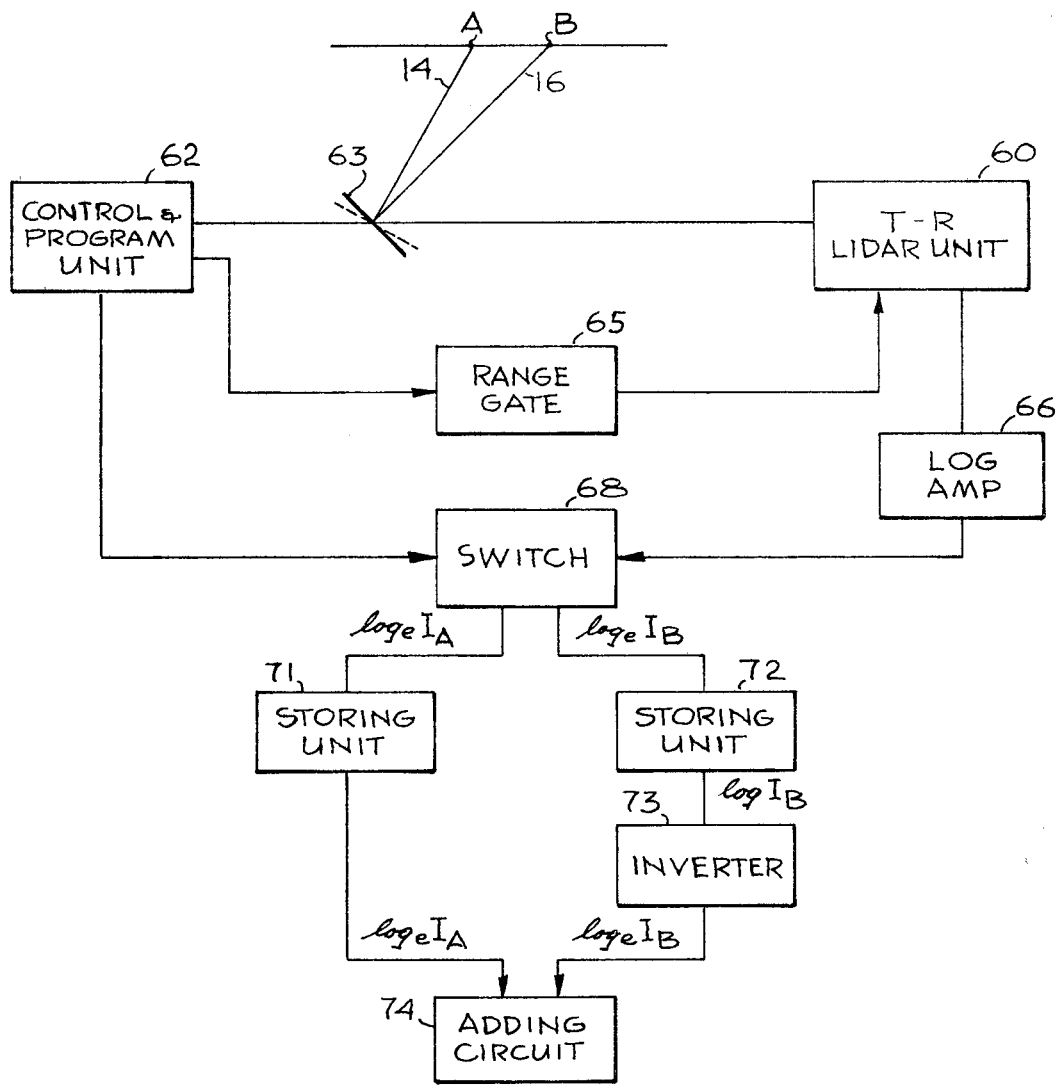
FIG. 5 is a block diagram of another embodiment of the invention.

In the embodiment of the invention, diagrammed in FIG. 2, a single lidar transmitter 21 and two lidar receivers are diagrammed, for providing signals indicating the intensity of the back-scattered returns from locations A and B at the critical height $h_c$. It should be appreciated that different transmitting and receiving arrangements may be used to provide such signals without resorting to two receivers. For example, as seen in FIG. 5, to which reference is made herein, a single transmitter-receiver (T-R) lidar unit 60 may be employed, together with a program and control unit 62. The function of the latter unit may be briefly described as controlling the transmitter lidar to provide a series of light pulses of equal intensities and control reflecting mirror 63 so that light from each odd pulse in the series is directed in the direction 14 towards the location A, while light from every even pulse is directed to location B along the direction or path 16. That is, unit 62 controls mirror 63 to vary its position so that light of alternate pulses is reflected in the same direction.

Unit 62 is also shown connected to a range gate 65 which is controlled by unit 62 to enable the receiving portion of the lidar unit 60 so that in response to light transmitted during every odd pulse, the receiver provides an output indicating the intensity of the back-scattered return from location A, while in response to light transmitted during every even pulse, the receiver is controlled to provide an output indicative of the intensity of the back-scattered returns from location B. The output of the receiver of the lidar unit 60 is supplied to a log amplifier 66, the output of which represents the logarithm of the intensity $I_A$ or $I_B$. This output is supplied to switch 68, controlled by unit 62 to switch the log $I_A$ signals to a storing unit 71, while switching the signals log $I_B$ signals to a storing unit 72. The output of the latter unit is supplied to an inverter circuit 73, the output of which represents $-\log I_B$.

The output of storing unit 71, representing log $I_A$, and the output of inverter 73 are supplied to a summer or adding circuit 74, the output of which represents the difference of the log signals or log $I_A$ divided by $I_B$, which, from Equation 2, is related to the measured mean coefficient of extinction $\bar{\sigma}$. The output of adding circuit 74 may be supplied to an arithmetic unit, such as unit 40 (see FIG. 2), for providing the exact measured value of the mean coefficient of extinction for display and/or recording in unit 42, hereinbefore described.

There has accordingly been shown and described herein a novel system for measuring the mean coefficient of extinction over a selected path from a point at a selected height above a reference height. From the measured value and a known critical value of the coefficient of extinction over the same path, the visibility conditions over the selected path from the point at such height are determinable or assessed. It is appreciated that those familiar with the art may make modifications and/or substitute equivalents in the arrangements as shown without departing from the true spirit of the invention. Therefore, all such modifications and/or equivalents are deemed to fall within the scope of the invention as claimed in the appended claims.

What is claimed is:
1. A system for measuring the coefficient of extinction of light over a selected path extending from a selected location at a selected height above a reference height to a fixed location at said reference height comprising:
   first means including means located at a fixed location at said reference height for transmitting light of a selected wavelength from said reference height toward said selected height along at least two paths about said selected path related in a predetermined angular relationship;
   second means including means located at said fixed location at said reference height for receiving light reflected thereto from at least two locations at said selected height along said at least two paths along which light was transmitted toward said selected height to provide signals indicative of the intensity of the light reflected therefrom;
   third means responsive to said signals for providing an output signal representing the coefficient of extinction of light along said selected path from said first means to said selected location at said selected height; and
   fourth means responsive to said output signal for utilizing said coefficient.

2. The system defined in claim 1 wherein said third means include means responsive to said signals indicative of the intensity of the light reflected from the locations along said two directions at said selected height for providing logarithmic signals representing the logarithms of the light intensities, said third means further including means responsive to said logarithmic signals and signals representing the light paths along said two directions between said reference and selected heights and said angular relationship for providing said output signal.

3. The system defined in claim 2 further including means for displaying the output signal representing the coefficient of extinction of light over said selected path from said first means to said locations at the selected height provided by said third means in relation to a displayed signal representing a critical value of the coefficient of extinction of light over the same selected path, to indicate as a function of the relationship of said output signal and said signal representing the critical value of the coefficient of extinction of light the visibility condition over said selected path.

4. The system defined in claim 3 wherein said signal representing the critical value of the coefficient of extinction of light over said selected path is expressable as σ and is a function of actual range D, extending from a light source to the locations at said selected height, light intensity of runway and lead-in light B, a visual threshold value $E_t$, a margin of safety factor $k$, the functional relationship being expressable as, $$\sigma = \frac{k}{D}\left[\log_e \frac{B}{E_t} - 2 \log_e V\right]$$

5. The system defined in claim 4 wherein said locations at said selected height are locations in a landing pattern of a piloted aircraft and the location of said first means is substantially the location of lead-in lights whereby the relative values of said output signal and the signal representing a critical value of the coefficient of extinction are indicative of whether a pilot sees the landing lights from said critical height.

6. A system for measuring the coefficient of extinction of light over a selected path from a selected location at a selected height to a transmitter location at a reference height comprising:
   a lidar transmitter for transmitting light from said reference height toward said selected height along first and second paths defining a selected angle therebetween whereby the distances along the two paths between said heights differ from one another by a predetermined length;

lidar receiving means at said reference height for providing signals indicative of light reflected thereto from locations along said first and second paths;

gating means for enabling said lidar receiving means to provide first and second signals indicative of the intensity of light reflected from first and second locations along said first and second paths, said first and second locations being at said selected height;

means responsive to at least said first and second signals for providing an output signal indicative of the measured value of the coefficient of extinction of light over a selected path between said first and second paths, said selected path extending from a selected location between said first and second locations at said selected height to the transmitter location at said reference height; and means responsive to said output signal for utilizing said coefficient of extinction.

7. The system defined in claim 6 wherein said means responsive to said first and second signals includes first logarithmic circuit for providing a third signal which is the logarithm of said first signal, a second logarithmic circuit for providing a fourth signal which is the logarithm of said second signal; and arithmetic means responsive to at least said third and fourth signals for providing said output signal related to the measured value of said coefficient of extinction.

8. The system defined in claim 7 further including means responsive to a signal representing a critical value of said coefficient of extinction and the output signal indicative of the measured value thereof for displaying the measured and critical values of said coefficient of extinction, to indicate the visibility conditions over said selected path.

9. The system defined in claim 8 wherein said locations at said selected height are substantially on a landing pattern of a piloted aircraft, means for generating said signal representing the critical value of said coefficient of extinction as a function of the light intensity of runway and lead-in lights of a landing strip on which said aircraft is to land, the relative value of said output signal with respect to the displayed critical value being indicative of whether the pilot is expected to see the runway and lead-in lights from said selected height.

References Cited

UNITED STATES PATENTS 3,146,293    8/1964    Lesage.
3,266,365    8/1966    Stavis _____ 356—4

FOREIGN PATENTS 794,472    5/1958    Great Britain.

OTHER REFERENCES

"The Determination of Atmospheric Transmissivity by Backscatter From a Pulsed-Light System," Motorola Res. Lab., AFRC TR–57–201; ASTIA Doc. No. 133,602, July 1957, pp. 1–16.

"Measurement of Atmospheric Transmissivity Using Backscattered Light From a Pulsed Light Beam," Horman, J.O.S.A., vol. 51, No. 6, June 1961, pp. 681–691.

"Measurement of Atmospheric Transmission Using Backscatter From a Pulsed Light Separated System," M. Horman, Motorola Report No. RLF–3828–3, ASTIA Doc. No. 217,614, June 1959.

RONALD L. WIBERT, Primary Examiner

R. J. WEBSTER, Assistant Examiner

U.S. Cl. X.R.

250—218; 343—6; 356—103